United States Patent
Mejuhas et al.

(10) Patent No.: US 7,661,637 B2
(45) Date of Patent: Feb. 16, 2010

(54) SEAT ATTACHMENT APPLICATION

(75) Inventors: Marsel Mejuhas, München (DE);
Jürgen Doll, Kressbronn (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 369 days.

(21) Appl. No.: 11/294,340

(22) Filed: Dec. 6, 2005

(65) Prior Publication Data

US 2007/0090261 A1    Apr. 26, 2007

(30) Foreign Application Priority Data

Oct. 14, 2005   (DE) .................. 10 2005 049 187

(51) Int. Cl.
*B60P 7/08*   (2006.01)

(52) U.S. Cl. .................. 248/157; 248/424; 248/429

(58) Field of Classification Search .................. 248/503, 248/503.1, 424, 429; 410/102, 104, 105; 244/118.1, 118.5, 118.6; 296/65.15, 65.12
See application file for complete search history.

(56) References Cited

U.S. PATENT DOCUMENTS

| | | | | |
|---|---|---|---|---|
| 4,047,689 A | * | 9/1977 | Grendahl | 410/105 |
| 4,062,298 A | * | 12/1977 | Weik | 410/105 |
| 4,376,522 A | * | 3/1983 | Banks | 248/503.1 |
| 4,496,271 A | * | 1/1985 | Spinosa et al. | 410/105 |
| 4,708,549 A | * | 11/1987 | Jensen | 410/105 |
| 4,771,969 A | | 9/1988 | Dowd | |
| 4,796,837 A | * | 1/1989 | Dowd | 244/122 R |
| 5,083,726 A | * | 1/1992 | Schurr | 244/118.6 |
| 5,489,172 A | | 2/1996 | Michler | |
| 5,871,318 A | | 2/1999 | Dixon et al. | |
| 6,902,365 B1 | | 6/2005 | Dowty | |

FOREIGN PATENT DOCUMENTS

| | | |
|---|---|---|
| DE | 25 52 761 A1 | 5/1977 |
| DE | 195 20 959 C2 | 12/1996 |
| DE | 199 37 652 A1 | 2/2001 |
| DE | 103 41 624 A1 | 4/2005 |
| EP | 0 463 757 | 1/1992 |
| GB | 2 406 877 | 4/2005 |

OTHER PUBLICATIONS

Office Action dated Jan. 30, 2008 in corresponding European patent application No. 06015643.7-2422.

* cited by examiner

*Primary Examiner*—J. Allen Shriver
*Assistant Examiner*—Steven Marsh
(74) *Attorney, Agent, or Firm*—Posz Law Group, PLC

(57) ABSTRACT

The invention is based on a seat attachment apparatus, in particular for attachment of a seat to a floor in an aircraft, having at least one horizontal attachment means and at least one vertical attachment means which can be moved in a horizontal longitudinal direction relative to the horizontal attachment means and having an operating means which can rotate, as well as a transmission unit for transmission of a rotary movement of the operating means to a linear movement of the vertical attachment means in the horizontal longitudinal direction. Preferably, the operating means has at least one rotation axis which includes an angle greater than zero with the horizontal longitudinal direction.

18 Claims, 6 Drawing Sheets

SEAT ATTACHMENT APPLICATION

CROSS REFERENCE TO RELATED APPLICATION

This application is related to, claims priority from and incorporates herein by reference German Patent Application No. DE 10 2005 049 187.1 filed on Oct. 14, 2005.

FIELD OF THE INVENTION

The invention relates generally to seat attachment apparatuses, and particularly to an aircraft seat attachment apparatus.

BACKGROUND OF THE INVENTION

A seat attachment apparatus for attachment of a seat to a floor of an aircraft is already known from U.S. Pat. No. 6,902,365 B1. The seat attachment apparatus has horizontal attachment means and vertical attachment means. The vertical attachment means can be moved relative to the horizontal attachment means in a horizontal longitudinal direction, parallel to a mounting rail. The seat attachment apparatus furthermore has an operating means which is mounted such that it can rotate, as well as a transmission unit for conversion of a rotary movement of the operating means to a linear movement of the vertical attachment means in the horizontal longitudinal direction. The operating means is formed by a rod which is aligned horizontally, parallel to the horizontal longitudinal direction, and has a rotation axis which matches its longitudinal axis. A thread which forms a part of the transmission unit and in which pins that are coupled to the vertical attachment means engage is integrally formed on the attachment means.

SUMMARY OF THE INVENTION

It is an object of the present invention to provide a seat attachment apparatus that allows a compact design.

The invention is based on a seat attachment apparatus, in particular for attachment of a seat to a floor in an aircraft, having at least one horizontal attachment means and at least one vertical attachment means which can be moved in a horizontal longitudinal direction relative to the horizontal attachment means and having an operating means which can rotate, as well as a transmission unit for transmission of a rotary movement of the operating means to a linear movement of the vertical attachment means in the horizontal longitudinal direction.

It is proposed that the operating means have at least one rotation axis which includes an angle greater than zero with the horizontal longitudinal direction. In this case, the expression "horizontal longitudinal direction" is intended to mean, in particular, a direction which extends at least essentially parallel to a floor contact plane, which is covered, for the seat attachment apparatus and/or—when considered in an installed position—a direction which extends to a main floor plane of a floor on which a seat is intended to be placed, and which, furthermore, is aligned in the longitudinal direction of the seat attachment apparatus—and thus in particular in or in the opposite direction to a seating direction of a seat to be installed—and in the longitudinal direction of a mounting rail which is mounted on the floor. The expression "vertical" is intended to mean in particular at least essentially at right angles to a floor contact plane which is covered by the seat attachment apparatus or standing on the main floor plane of the floor on which a seat is intended to be placed. The feature "greater than zero" is intended to mean, in particular, that the alignment of the rotation axis is deliberately chosen to be different from the horizontal longitudinal direction, so that this results in particular in a preferably significant angular discrepancy which is greater than any angular discrepancy resulting from tolerances.

A particularly compact configuration of simple design can be achieved by means of a corresponding refinement according to the invention, to be precise by the capability to design the operating means to be particular short and compact. Furthermore, a convenient operating capability can be achieved, to be precise in particular by the rotation axis including an angle greater than zero with a horizontal plane of the seat attachment apparatus and/or the rotation axis of the operating means including an angle of greater than 20°, preferably of greater than 45° and particularly preferably of greater than 60° with the horizontal longitudinal direction, and/or particularly preferably with the horizontal plane. In this case, the expression "a horizontal plane" is intended to mean in particular a plane which runs parallel to a floor contact plane which is covered by the seat attachment apparatus. The rotary movement of the operating means can be converted to the linear movement of the vertical attachment means by various transmission means which appear to a person skilled in the art to be worthwhile, for example via a thread, a toothed rod, a gearwheel etc. If the transmission unit has an eccentric which is provided for conversion of the rotary movement of the operating means to the linear movement of the vertical attachment means, the corresponding conversion can be achieved in a physically particularly simple manner, with a compact design.

A further refinement of the invention proposes that the transmission unit be provided for conversion of the rotary movement of the operating means to a stressing movement, thus making it possible to avoid additional assembly and/or disassembly steps, and making it possible to increase the convenience of use. In this case, the expression "a stressing movement" is intended to mean both a movement for decreasing and in particular for increasing a stressing force and a movement for producing or increasing a stressing force.

If the transmission unit has a cam transmission unit in order to convert the rotary movement to a stressing movement, the rotary movement can be converted appropriately in a physically simple manner, with a compact design. In this case, the expression "a cam transmission unit" is intended to mean in particular a unit which has a cam element which forms a cam track and has a probe element which is intended to correspond to the cam track. Alternatively and/or in addition to a cam transmission unit it is, however, also feasible to use other transmission units which appear to a person skilled in the art to be worthwhile, such as gearwheel transmission units, lever transmission units, etc.

In this case, the cam transmission unit may have a rigid probe element or a probe element which is mounted such that it cannot move, so that a component with the cam track is driven appropriately in a desired direction by the relative movement between the probe element and the cam element, or the cam transmission unit may have a probe element which is mounted such that it can move, thus making it possible to reduce the design complexity. In particular, it is possible to avoid a need for the operating means to be mounted such that it can be moved translationally in addition to mounting it such that it can rotate.

If the eccentric and the cam transmission unit are at least partially integral, it is possible to save additional components, physical space, weight, assembly effort and costs.

A further refinement of the invention proposes that the seat attachment apparatus have at least one spring element, which is formed separately from the vertical attachment means and is provided for elastic deflection by means of the stressing movement. In this case, the expression "separately" is intended to mean in particular that the spring element and the vertical attachment means can be produced at least from different materials, so that, in particular, the materials can advantageously be matched to the functions.

If the spring element is in the form of a strip, that is to say it is relatively thin in comparison to its length and width, the spring element can be integrated in a space-saving manner, and can also advantageously be used for further functions. If the spring element is provided as a cover element, additional cover elements can be avoided, and a relatively large spring element can be achieved without at least major physical space disadvantages, by means of which an advantageously long spring movement can be achieved.

If the seat attachment apparatus has a locking indication unit and/or the seat attachment apparatus has a rotation locking unit, which is provided in order to secure the operating means in at least one rotation position, then increased operating confidence can be achieved.

If the locking indication unit and the spring element, the rotation locking unit and the spring element, and/or the rotation locking unit and the eccentric are at least partially integral, it is once again possible to save additional components, physical space, weight, assembly effort and costs.

A seat attachment apparatus according to the invention is particularly advantageously suitable for attachment of an aircraft seat in an aircraft, but can also be used in other areas which appear to a person skilled in the art to be worthwhile, for example the field of vehicles, such as relatively large passenger vehicles, coaches, ferries, or for seating in auditoriums, for example for a congress hall, a theatre auditorium, a cinema auditorium etc. Furthermore, the seat attachment apparatus can also be used for firmly lashing loads, baggage or other transported items in aircraft and vehicles of any type.

BRIEF DESCRIPTION OF THE DRAWINGS

Further advantages will become evident from the following description of the drawing. The drawing illustrates exemplary embodiments of the invention. The drawing, the description and the claims contain numerous features in combination. A person skilled in the art will also expediently consider the features individually and combine them to form worthwhile further combinations.

In the Figures.

DETAILED DESCRIPTION OF THE PREFERRED EMBODIMENTS

Figure 1:
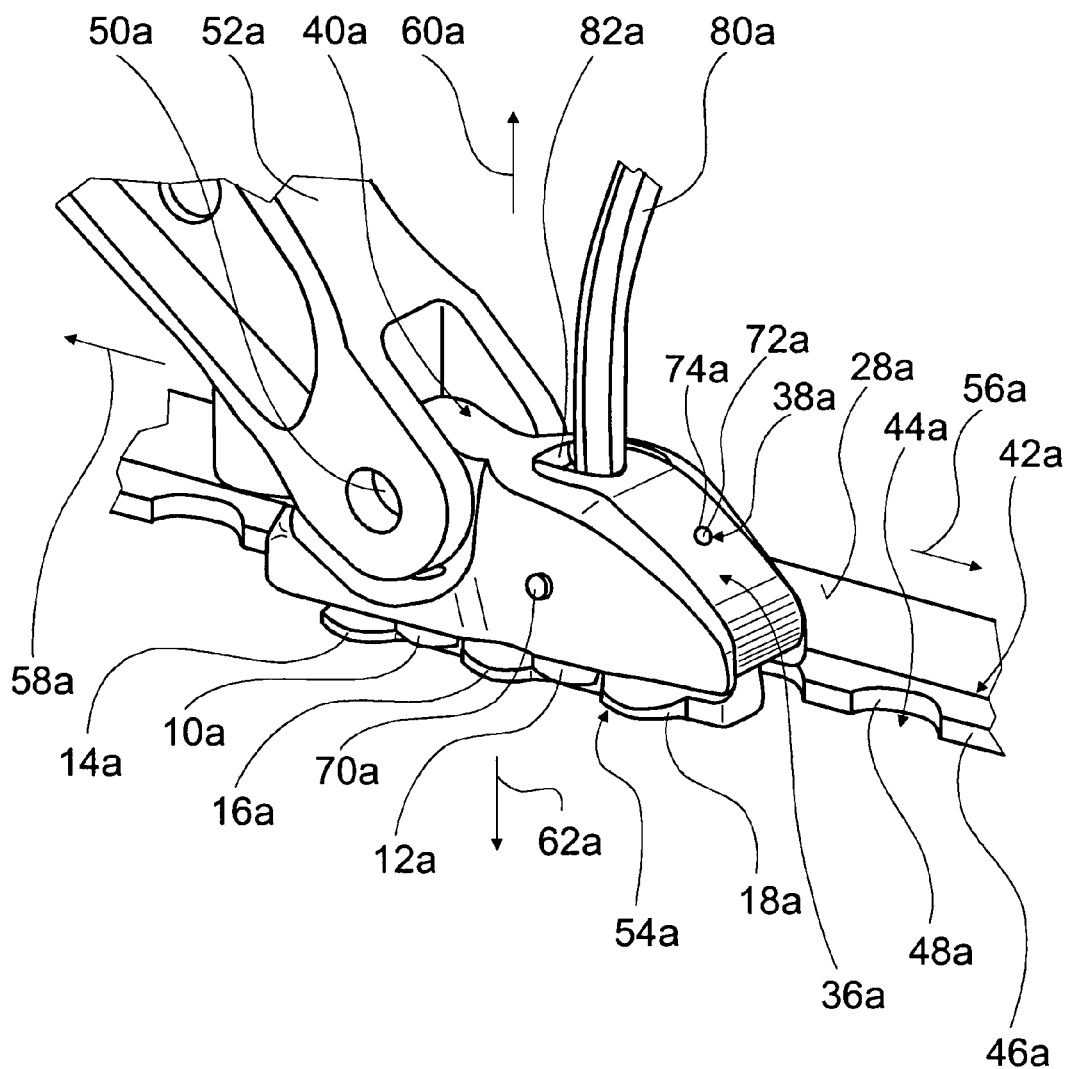
FIG. 1 shows a seat attachment apparatus obliquely from above in the installed state on a mounting rail.

FIG. 1 shows a seat attachment apparatus for attachment of a seat to a floor 28a or to a cabin floor in an aircraft, to be precise to mounting rails 42a, which run in the longitudinal direction of the aircraft, are attached to the cabin floor and are aligned parallel with it. The mounting rails 42a end with their upper face flush with the floor 28a or cabin floor of the aircraft. The mounting rail 42a is formed by a hollow profile, which bounds a longitudinal channel 44a on its upper face, with mutually facing profiled flanks 46a. The longitudinal channel 44a has aperture openings 48a which broaden its free inlet cross section to a predetermined extent, are at a uniform distance from one another, and are in the form of holes.

Figure 2:
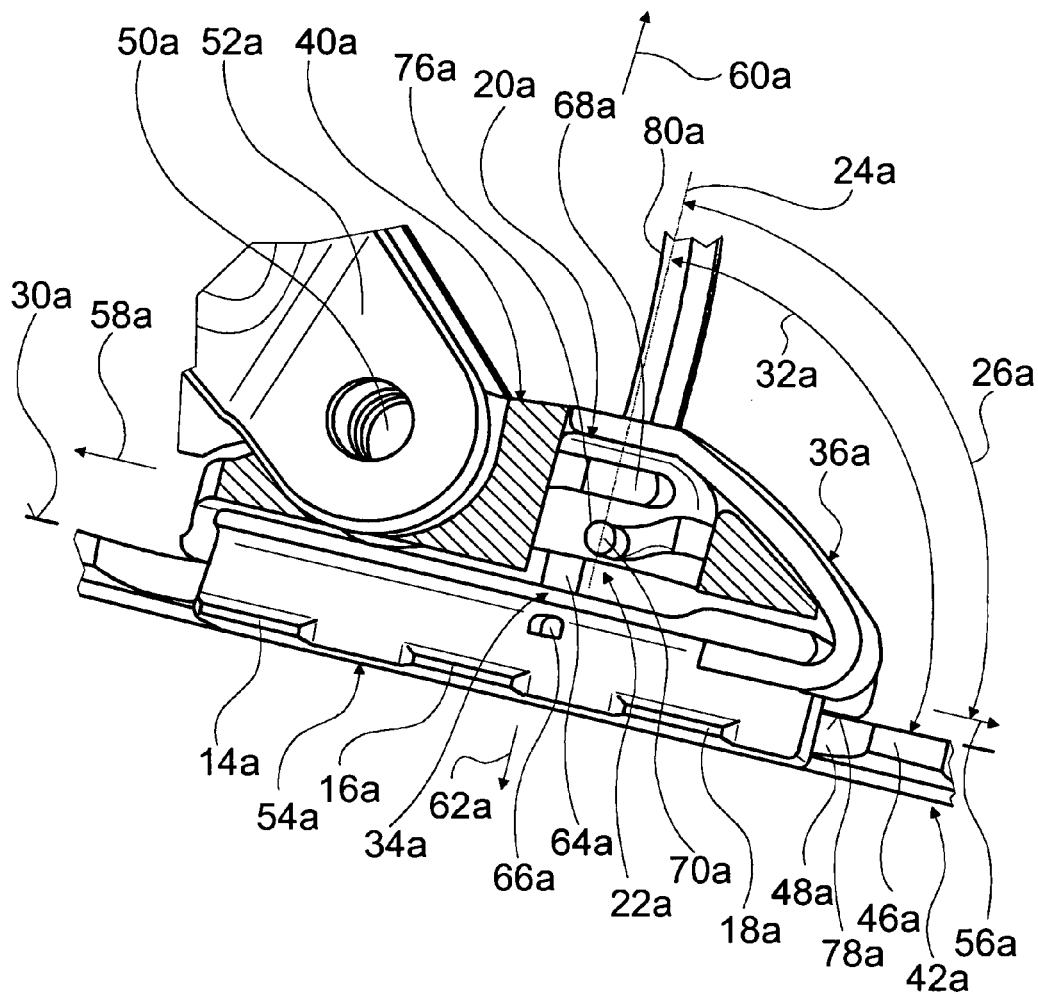
FIG. 2 shows the seat attachment apparatus shown in FIG. 1, in the form of a partial longitudinal section in a locked position.

The seat attachment apparatus has a base body 40a with an integrally formed bearing eye 50a for attachment of a seat foot 52a. Horizontal attachment means 10a, 12a are also integrally formed on the base body 40a (FIGS. 1 and 2). The horizontal attachment means 10a, 12a extend in the vertical direction 62a beyond a contact surface 78a of the base body 40a, by means of which the base body 40a comes to rest on the upper face of the mounting rail 42a during installation, and with the contact surface 78a covering a plane, which is defined as the horizontal plane 30a, of the seat attachment apparatus, which, when viewed in the installed position, is aligned at least essentially parallel to the floor 28a. Furthermore, the horizontal attachment means 10a, 12a have shaped areas which are in the form of circular segments and project transversely with respect to the longitudinal extent of the base body 40a on both sides.

In addition, the seat attachment apparatus has a sliding part 54a which can be moved in the horizontal longitudinal direction 56a, 58a relative to the base body 40a and on which vertical attachment means 14a, 16a, 18a are integrally formed, which are at a distance from the horizontal attachment means 10a, 12a in the longitudinal direction of the seat attachment apparatus and in the horizontal longitudinal direction 56a, 58a. The horizontal longitudinal direction 56a, 58a extends at least essentially parallel to the longitudinal direction of the sliding part 54a, and, when viewed in the installed position, at least essentially parallel to the mounting rail 42a and thus essentially parallel to the floor 28a.

The vertical attachment means 14a, 16a, 18a project beyond the horizontal attachment means 10a, 12a in the vertical direction 62a facing away from a cover face of the seat attachment apparatus, and have shaped areas which are in the form of circular segments and project transversely with respect to the longitudinal extent of the sliding part 54a on both sides.

Furthermore, the seat attachment apparatus has an operating means 20a, which is mounted in a recess in the base body 40a such that it can rotate while its rotary movement is guided by the base body 40a, as well as a transmission unit 22a for conversion of a rotary movement of the operating means 20a to a linear movement of the sliding part 54a with the vertical attachment means 14a, 16a, 18a in the horizontal longitudinal direction 56a, 58a.

The operating means 20a has a rotation axis 24a, which includes an angle 26a of about 90° with the horizontal longitudinal direction 56a, 58a and an angle 32a of approximately 90° with the horizontal plane 30a of the seat attachment apparatus, and the rotation axis 24a is aligned at least essentially at right angles to the horizontal plane 30a of the seat attachment apparatus, and, when viewed in the installed position, at least essentially at right angles to the floor 28a.

Figure 4:
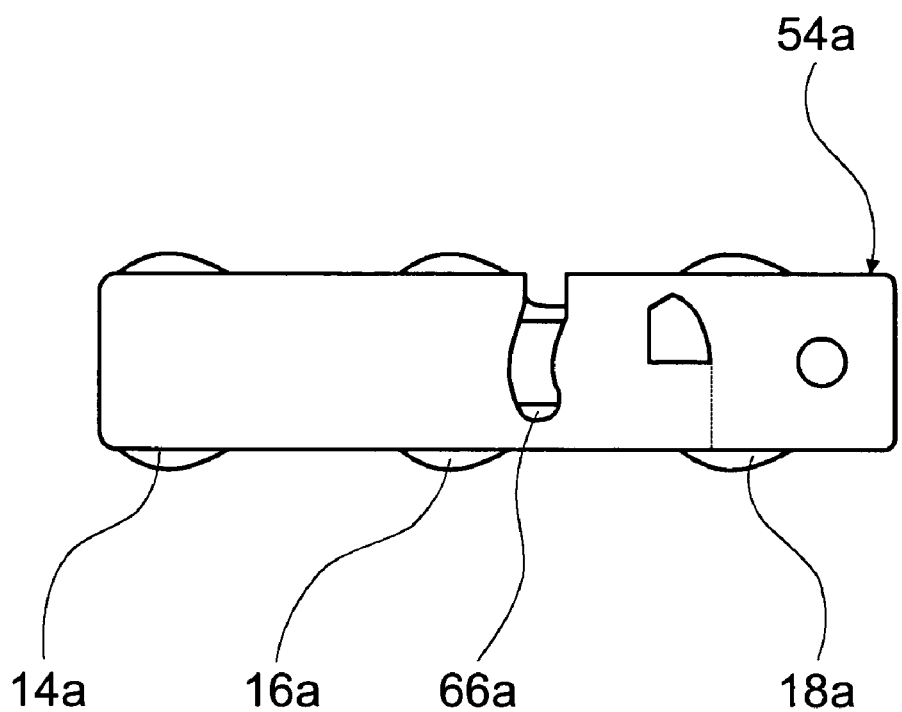
FIG. 4 shows a plan view of an individual part of the seat attachment apparatus.

The transmission unit 22a has an eccentric 34a which is at least partially formed integrally with the operating means 20a and is provided in order to convert the rotary movement of the operating means 20a to the linear movement in the horizontal longitudinal direction 56a, 58a of the sliding part 54a with the vertical attachment means 14a, 16a, 18a. In this case, the eccentric 34a has an eccentric pin 64a, which is at a radial distance from the rotation axis 24a on a lower face of the operating means 20a, and is screwed eccentrically into it. The eccentric pin 64a engages in a curved elongated hole 66a, in the sliding part 54a, which is aligned transversely with respect to the longitudinal extent of the sliding part 54a and transversely with respect to the horizontal longitudinal direction 56a, 58a (FIG. 4).

Furthermore, the transmission unit 22a is provided for conversion of the rotary movement of the operating means 20a to a stressing movement. For this purpose, the transmission unit 22a has a cam transmission unit with a cam element 68a, which is integrally formed on the operating means 20a and is formed by a groove, and probe elements 70a, which are mounted in the base body 40a on both sides, are formed by pins and engage in the groove which forms the cam element 68a, only one of which is illustrated. The probe elements 70a are arranged at slightly offset heights in the vertical direction 60a or 62a, respectively, in the base body 40a, thus making it possible to achieve a particularly physically short operating means 20a and an advantageous probe function.

The seat attachment apparatus has a spring element 36a, which is formed separately from the sliding part 54a and from the vertical attachment means 14a, 16a, 18a, in the form of a strip, is essentially V-shaped when viewed from the side, and is composed of spring sheet steel, which is intended to be elastically deflected by the stressing movement. One free end of the spring element 36a is clamped into the sliding part 54a via a screw connection, which is not illustrated in more detail, has a bend through about 130° after its clamping-in area, and, starting from its bend, extends in the direction of the operating means 20a. The spring element 36a is used as a cover element, and forms a cover face of the seat attachment apparatus.

Furthermore, the seat attachment apparatus has a locking indication unit 38a and a rotation locking unit, which is provided for securing the operating means 20a in a rotation position associated with a locked position, both of which are partially integral with the spring element 36a.

The locking indication unit 38a is formed essentially by a colored area 72a arranged on the base body 40a, and a recess 74a in the spring element 36a, which comes to rest above the area 72a when the seat attachment apparatus is locked, so that the colored area 72a can be seen through the recess 74a in the spring element 36a (FIGS. 1 and 2).

The rotation locking unit is formed essentially by a shaped area on the cam element 68a, which is integrally formed on the operating means 20a, or by an indentation 76a, by the probe element 70a and by the spring element 36a, which loads the operating means 20a in the direction of the probe element 70a in a locked position, so that the probe element 70a is arranged in a spring-loaded manner in the indentation 76a, thus reliably preventing the operating means 20a from undesirably becoming loose from a locked position (FIG. 2).

Figure 3:
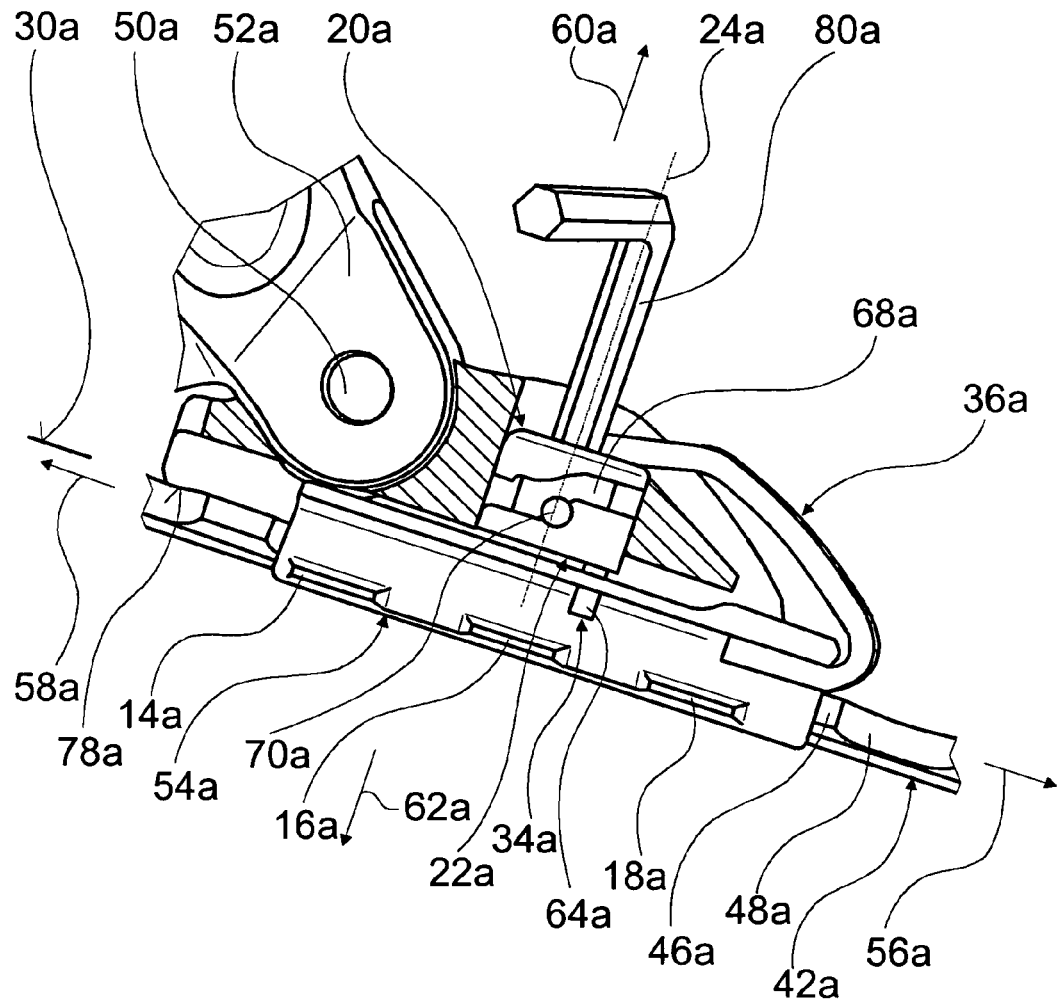
FIG. 3 shows the seat attachment apparatus shown in FIG. 1, in the form of a partial longitudinal section in an unlocked position.

During installation, the seat attachment apparatus is placed on the mounting rail 42a. During this process, the horizontal attachment means 10a, 12a engage in an interlocking manner in the aperture openings 48a in the horizontal longitudinal direction 56a, 58a, so that the seat attachment apparatus is fixed in an interlocking manner via the horizontal attachment means 10a, 12a in the horizontal longitudinal direction 56a, 58a. The vertical attachment means 14a, 16a, 18a are passed through the aperture openings 48a, and the base body 40a comes to rest with its contact surface 78a, which runs parallel to that plane of the seat attachment apparatus which is defined as the horizontal plane 30a, on the upper face of the mounting rail 42a (FIG. 3). On its cover face and/or on the face which faces away from the vertical attachment means 14a, 16a, 18a, the operating means 20a has a hexagonal recess by means of which the operating means 20a can then be rotated by means of a hexagonal key 80a through about 210° in the counter-clockwise direction from its unlocked position to its locked position (FIGS. 3 and 2). The end profile of the elongated hole 66a describes, towards the edge of the sliding part 54a, a circular path which is forced outwards, so that a desired longitudinal movement is achieved by means of a revolution of 210° (FIG. 4). End stops which are formed by the cam element 68a ensure that the operating means 20a can be rotated through a maximum of 210°. At its end facing the operating means 20a, the spring element 36a has a recess 82a, by means of which the hexagonal key 80a can be guided in order to operate the operating means 20a.

The rotary movement of the operating means 20a results in the sliding part 54a being moved together with the vertical attachment means 14a, 16a, 18a, and driven by means of the eccentric 34a, through 12.7 mm in the horizontal longitudinal direction 58a, so that the vertical attachment means 14a, 16a, 18a come to rest underneath the profiled flanks 46a.

Furthermore, the same is moved by the rotary movement of the operating means 20a, driven by means of the cam transmission unit, in the vertical direction 60a, by which means the spring element 36a, which rests on an upper face of the operating means 20a, is deflected and stressed. The eccentric pin 64a is designed to be appropriately long so that it always engages in the elongated hole 66a.

In the stressed state, the spring element 36a ends flush with a cover face of the base body 40a, and comes to rest with its recess 74a above the colored marked area 72a. A stressing force which is built up by the deflection of the spring element 36a is transmitted by the spring element 36a to the sliding part 54a, so that it is moved, together with the vertical attachment means 14a, 16a, 18a, in the vertical direction 60a with respect to the base body 40a, and the vertical attachment means 14a, 16a, 18a rest on a lower face of the profiled flanks 46a with a stressing force applied to this face. The seat attachment apparatus is thus fixed in an interlocking manner with a force fit in the horizontal longitudinal direction 56a, 58a and in the vertical direction 60a, 62a. In particular, the force fit makes it possible to prevent relative movements of the seat attachment apparatus with respect to the mounting rail 42a, and the production of noise as a result of this.

The seat attachment apparatus is unlocked in a corresponding manner, but in the opposite sequence, to the locking process.

Figure 5:
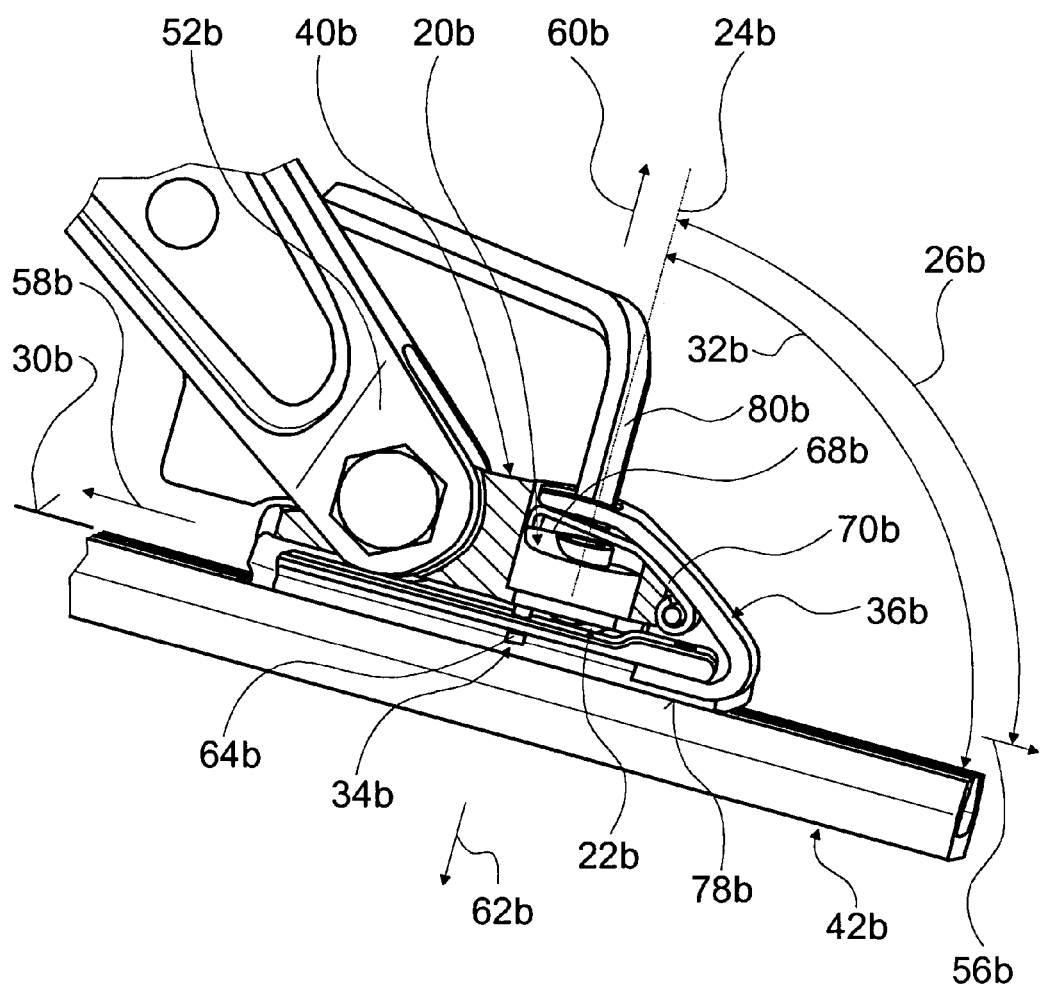
FIG. 5 shows an alternative seat attachment apparatus in the form of a partial longitudinal section in a locked position.
Figure 6:
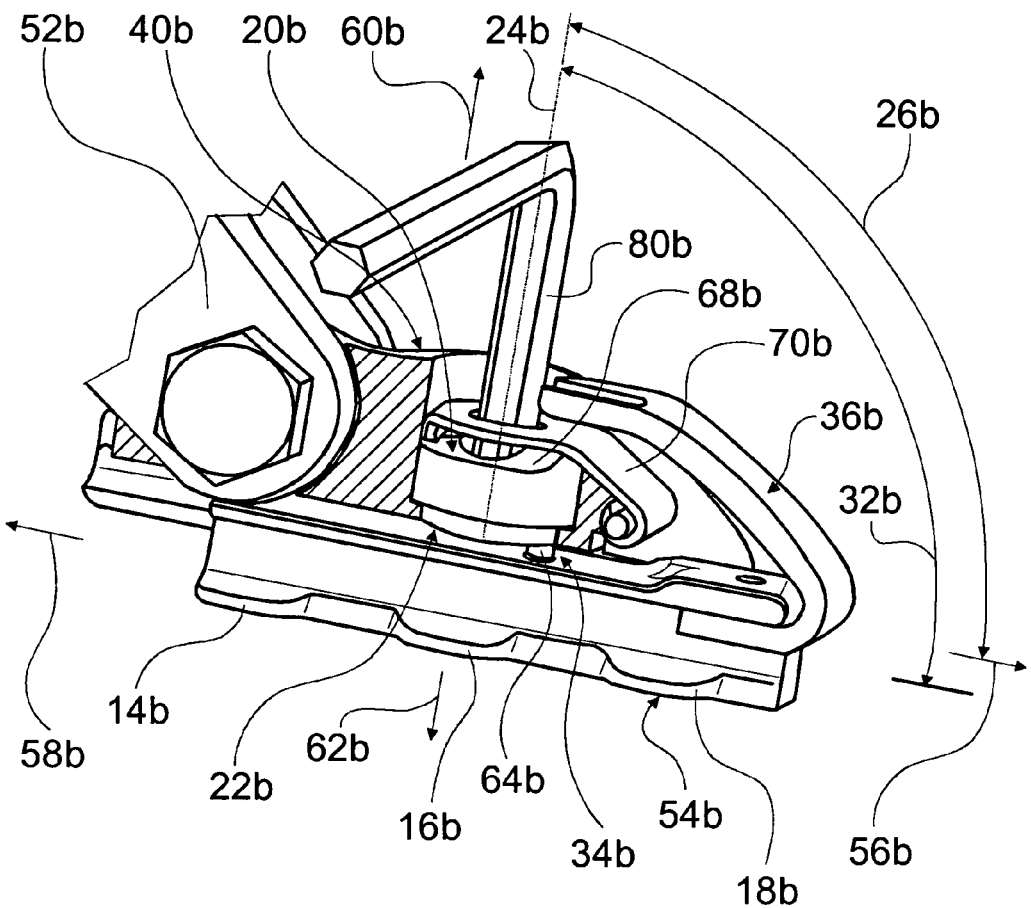
FIG. 6 shows the seat attachment apparatus as shown in FIG. 5 in an unlocked position.

A further exemplary embodiment of the invention is illustrated in FIGS. 5 and 6. Features and functions which remain essentially the same are in principle numbered with the same reference symbols. The letters "a" and "b" are added to the reference symbols in order to distinguish between the exemplary embodiments. The following description is restricted essentially to the differences from the exemplary embodiment in FIGS. 1 to 4. Reference should be made to the description relating to the exemplary embodiment in FIGS. 1 to 4 with regard to features and functions which remain the same.

FIGS. 5 and 6 show a seat attachment apparatus having an operating means 20b which, instead of having a cam element 68a formed by a groove, has a cam element 68b which is arranged on a cover face and is formed by a cam contour. The cam element 68b interacts with a probe element 70b which is mounted such that it can pivot, is formed by a bending metal sheet and has, at its free end, a bend whose end face rests on the cam contour. When the operating means 20b is rotated, a sliding part 54b is moved, in a corresponding manner to that in the exemplary embodiment in FIGS. 1 to 4, in the horizontal longitudinal direction 58b by means of an eccentric 34b (FIGS. 6 and 5). Furthermore, the rotary movement of the operating means 20b pivots the probe element 70b, driven by means of the cam transmission unit, in the vertical direction 60b, as a result of which a spring element 36b, which rests on an upper face of the probe element 70b, is deflected and stressed without the operating means 20b in its entirety carrying out a linear movement in the vertical direction 60b.

The invention claimed is:

1. A seat attachment apparatus, in particular for attachment of a seat to a floor in an aircraft, comprising:
   a base body;
   at least one horizontal attachment means, which is provided for fixing the base body in a horizontal longitudinal direction essentially parallel to the floor in an interlocking manner with a mounting rail;
   at least one vertical attachment means which can be moved in the horizontal longitudinal direction relative to the horizontal attachment means;
   an operating means which can rotate about a rotation axis; and,
   a transmission unit for transmission of a rotary movement of the operating means to a linear movement of the vertical attachment means in the horizontal longitudinal direction, wherein the rotation axis forms an angle greater than zero with respect to the horizontal longitudinal direction.

2. The seat attachment apparatus as claimed in claim 1, wherein the rotation axis includes an angle greater than zero with a horizontal plane.

3. The seat attachment apparatus as claimed in claim 1, wherein the rotation axis of the operating means includes an angle of greater than 20° with the horizontal longitudinal direction.

4. The seat attachment apparatus as claimed in claim 2, wherein the rotation axis of the operating means includes an angle of greater than 20° with the horizontal plane.

5. The seat attachment apparatus as claimed in claim 1, wherein the transmission unit has an eccentric which is provided for conversion of the rotary movement of the operating means to the linear movement in the horizontal longitudinal direction of the vertical attachment means.

6. The seat attachment apparatus as claimed in claim 1, wherein the transmission unit is provided to convert the rotary movement of the operating means to a stressing movement.

7. The seat attachment apparatus as claimed in claim 6, wherein the transmission unit has a cam transmission unit in order to the convert the rotary movement to the stressing movement.

8. The seat attachment apparatus as claimed in claim 7, wherein the cam transmission unit of the transmission unit has a probe element which is mounted such that it can move.

9. The seat attachment apparatus at least as claimed in claim 5, wherein the eccentric and the cam transmission unit are at least partially integral.

10. The seat attachment apparatus at least as claimed in claim 6, comprising at least one spring element, which is formed separately from the vertical attachment means and is provided for elastic deflection by means of the stressing movement.

11. The seat attachment apparatus as claimed in claim 10, wherein the spring element is in the form of a strip.

12. The seat attachment apparatus at least as claimed in claim 10, wherein the spring element is provided as a cover element.

13. The seat attachment apparatus as claimed in claim 1, comprising a locking indication unit.

14. The seat attachment apparatus at least as claimed in claim 10, wherein a locking indication unit and the spring element are at least partially integral.

15. The seat attachment apparatus as claimed in claim 1, comprising a rotation locking unit, which is provided in order to secure the operating means in at least one rotation position.

16. The seat attachment apparatus at least as claimed in claim 10, wherein a rotation locking unit and the spring element are least partially integral.

17. The seat attachment apparatus at least as claimed in claim 5, wherein a rotation locking unit and the eccentric are at least partially integral.

18. A seat attachment apparatus, for attaching a seat to a mounting rail on a floor of an aircraft, the apparatus comprising:
   a base body;
   a horizontal attachment engagement surface, which fixes the base body in a horizontal longitudinal direction essentially parallel to the floor and which is adapted to engage in an interlocking manner with the mounting rail;
   a vertical attachment engagement surface, which can be moved in the horizontal longitudinal direction relative to the horizontal attachment engagement surface and which is adapted to engage with the mounting rail;
   an operating cam mechanism, which can rotate about a rotation axis, wherein the rotation axis forms an angle greater than zero with respect to the horizontal longitudinal direction; and
   an eccentric mechanism for converting rotary movement of the cam mechanism to linear movement of the vertical attachment engagement surface in the horizontal longitudinal direction.

* * * * *

UNITED STATES PATENT AND TRADEMARK OFFICE
CERTIFICATE OF CORRECTION

| | | |
|---|---|---|
| PATENT NO. | : 7,661,637 B2 | Page 1 of 1 |
| APPLICATION NO. | : 11/294340 | |
| DATED | : February 16, 2010 | |
| INVENTOR(S) | : Marsel Mejuhas et al. | |

It is certified that error appears in the above-identified patent and that said Letters Patent is hereby corrected as shown below:

Title page, Item (54) and Col. 1, Title

Change "SEAT ATTACHMENT APPLICATION" to
--SEAT ATTACHMENT APPARATUS--.

Signed and Sealed this

Twenty-eighth Day of September, 2010

David J. Kappos
*Director of the United States Patent and Trademark Office*